(12) United States Patent
Ballantine et al.

(10) Patent No.: US 11,456,474 B2
(45) Date of Patent: Sep. 27, 2022

(54) INTEGRATED POWER GENERATION, CARBON DIOXIDE SEPARATION AND DOWNSTREAM PROCESSING SYSTEM AND METHOD

(71) Applicant: BLOOM ENERGY CORPORATION, San Jose, CA (US)

(72) Inventors: Arne Ballantine, Palo Alto, CA (US); Jayakumar Krishnadass, Sunnyvale, CA (US); Chockkalingam Karuppaiah, Fremont, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 136 days.

(21) Appl. No.: 16/931,841

(22) Filed: Jul. 17, 2020

(65) Prior Publication Data
US 2021/0020974 A1    Jan. 21, 2021

Related U.S. Application Data

(60) Provisional application No. 62/876,227, filed on Jul. 19, 2019.

(51) Int. Cl.
| | |
|---|---|
| *H01M 8/0668* | (2016.01) |
| *H01M 8/04746* | (2016.01) |
| *H01M 8/04007* | (2016.01) |
| *H01M 8/04119* | (2016.01) |
| *H01M 8/249* | (2016.01) |
| *H01M 8/12* | (2016.01) |
| *H01M 8/0612* | (2016.01) |

(52) U.S. Cl.
CPC ..... *H01M 8/0668* (2013.01); *H01M 8/04059* (2013.01); *H01M 8/04164* (2013.01); *H01M 8/04753* (2013.01); *H01M 8/0612* (2013.01); *H01M 8/12* (2013.01); *H01M 8/249* (2013.01); *H01M 2008/1293* (2013.01); *H01M 2250/20* (2013.01)

(58) Field of Classification Search
CPC ......... H01M 8/04059; H01M 8/04164; H01M 8/04753; H01M 8/0612; H01M 8/0668
USPC ........................................ 429/410
See application file for complete search history.

(56) References Cited

U.S. PATENT DOCUMENTS

| | | |
|---|---|---|
| 6,997,703 B2 | 2/2006 | Kurashima et al. |
| 7,368,194 B2 | 5/2008 | Dickman et al. |

(Continued)

FOREIGN PATENT DOCUMENTS

WO    WO2016135613 A1    9/2016

OTHER PUBLICATIONS

Notification of Transmittal of the International Search Report and Written Opinion of the International Search Authority for International Patent Application No. PCT/US2020/042456, dated Oct. 30, 2020, 13 pages.

(Continued)

*Primary Examiner* — James M Erwin
(74) *Attorney, Agent, or Firm* — Miles & Stockbridge P.C.

(57) ABSTRACT

An integrated power generation and exhaust processing system includes a fuel cell system configured to generate power and to separate $CO_2$ included in exhaust output from the fuel cell system, and an exhaust processing system configured to at least one of sequester or densify $CO_2$ separated from the exhaust output from the fuel cell system.

18 Claims, 8 Drawing Sheets

(56) References Cited

U.S. PATENT DOCUMENTS

| | | | |
|---|---|---|---|
| 7,482,078 | B2 | 1/2009 | Sridhar et al. |
| 7,520,916 | B2 | 4/2009 | McElroy et al. |
| 7,833,668 | B2 | 11/2010 | Ballantine et al. |
| 7,883,803 | B2 | 2/2011 | McElroy et al. |
| 8,101,307 | B2 | 1/2012 | McElroy et al. |
| 8,211,583 | B2 | 7/2012 | Weingaertner et al. |
| 9,190,673 | B2 | 11/2015 | Venkataraman et al. |
| 9,190,685 | B2 | 11/2015 | McElroy et al. |
| 10,173,178 | B1 | 1/2019 | Deshpande et al. |
| 10,186,724 | B2 | 1/2019 | Gasda et al. |
| 2004/0202914 | A1 | 10/2004 | Sridhar et al. |
| 2005/0271914 | A1 | 12/2005 | Farooque et al. |
| 2008/0241638 | A1 | 10/2008 | McElroy et al. |
| 2009/0280360 | A1 | 11/2009 | Weingaertner et al. |
| 2010/0266923 | A1 | 10/2010 | McElroy et al. |
| 2010/0279181 | A1* | 11/2010 | Adams, II ........... H01M 8/0612 429/410 |
| 2012/0178003 | A1 | 7/2012 | Venkataraman et al. |
| 2013/0108936 | A1 | 5/2013 | McElroy et al. |
| 2016/0043413 | A1 | 2/2016 | McElroy et al. |
| 2016/0248111 | A1 | 8/2016 | Gasda et al. |
| 2016/0359182 | A1 | 12/2016 | Farooque et al. |
| 2018/0261864 | A1* | 9/2018 | Jahnke ..................... C25B 1/04 |
| 2019/0140297 | A1 | 5/2019 | Gasda et al. |

OTHER PUBLICATIONS

U.S. Appl. No. 16/790,269, filed Feb. 13, 2020, Bloom Energy Corporation.

* cited by examiner

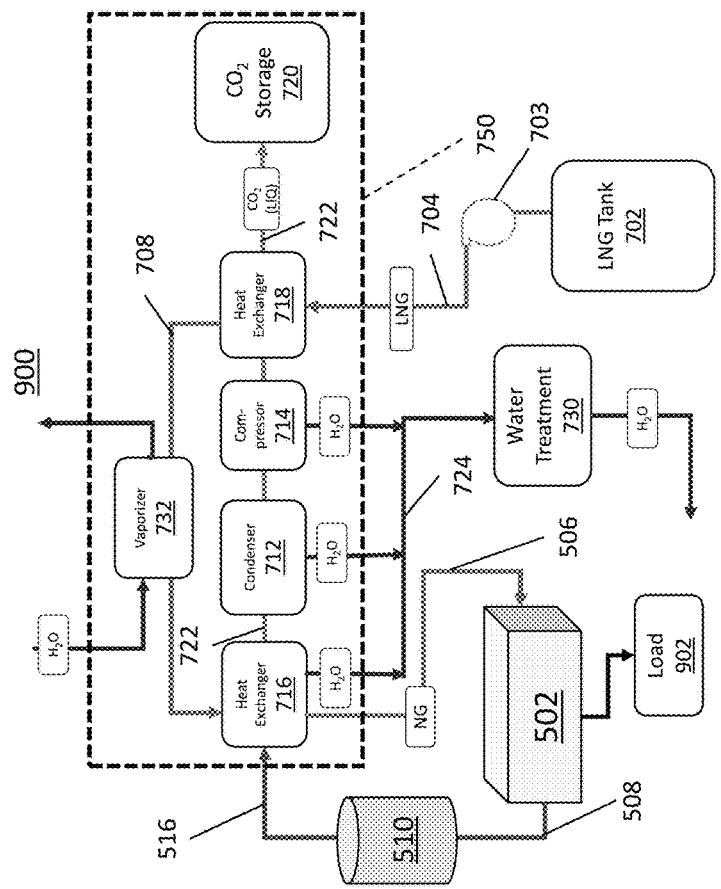
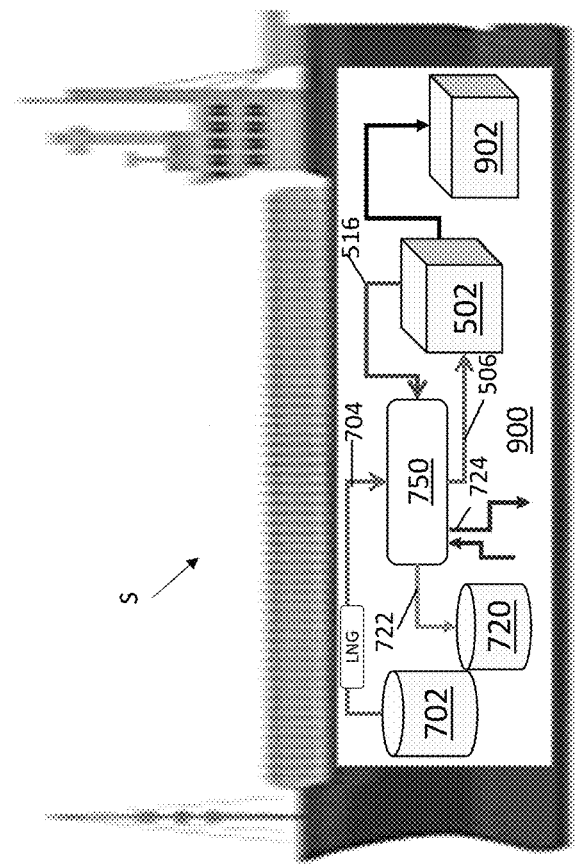
FIG. 9B
FIG. 9A

INTEGRATED POWER GENERATION, CARBON DIOXIDE SEPARATION AND DOWNSTREAM PROCESSING SYSTEM AND METHOD

BACKGROUND

The present invention relates generally to the field of fuel cell systems and more particularly to fuel cell systems integrated with carbon dioxide removal and downstream processing components.

Fuel cells are electrochemical devices which can convert energy stored in fuels to electrical energy efficiencies. High temperature fuel cells include solid oxide and molten carbonate fuel cells. These fuel cells may operate using hydrogen and/or hydrocarbon fuels. There are classes of fuel cells, such as the solid oxide regenerative fuel cells, that also allow reversed operation, such that oxidized fuel can be reduced back to unoxidized fuel using electrical energy as an input.

SUMMARY

Various embodiments of the present disclosure provide an integrated power generation and exhaust processing system includes a fuel cell system configured to generate power and to separate $CO_2$ included in exhaust output from the fuel cell system, and an exhaust processing system configured to at least one of sequester or densify $CO_2$ separated from the exhaust output from the fuel cell system.

Various embodiments of the present disclosure provide a method of operating a fuel cell system, comprising providing a fuel to a fuel cell system, operating the fuel cell system to generate power and a fuel exhaust stream, separating $CO_2$ from the fuel exhaust stream using a carbon dioxide separation device to generate a $CO_2$ containing exhaust and a purified exhaust, providing the separated $CO_2$ containing exhaust to an exhaust processing system, and at least one of sequestering or densifying $CO_2$ in the $CO_2$ containing exhaust using the exhaust processing system.

Various embodiments of the present disclosure provide a method of operating a fuel cell system, comprising providing a fuel to a fuel cell system, operating the fuel cell system to generate power and a fuel exhaust stream, separating $CO_2$ from the fuel exhaust stream using a carbon dioxide separation device to generate a $CO_2$ containing exhaust and a purified exhaust; and providing the separated $CO_2$ containing exhaust and solid CaO to a NaOH containing solution, such that the $CO_2$ gas reacts with the NaOH (l) to form $Na_2CO_3$ (l) and water, such that the CaO (s) reacts with the water to form $Ca(OH)_2$ (l), and such that the $Na_2CO_3$ (l) and the $Ca(OH)_2$ (l) react to precipitate solid $CaCO_3$ and NaOH (l). The NaOH (l) may be recycled back into the process to react with additional $CO_2$ gas.

BRIEF DESCRIPTION OF THE DRAWINGS

FIG. 9A is schematic view of a combined LNG fuel cell power and exhaust processing system in a ship, according to various embodiments of the present disclosure, and FIG. 9B is a schematic view showing components of an exhaust processing system of the system.

DETAILED DESCRIPTION OF THE EMBODIMENTS

The embodiments of the invention illustrate how carbon dioxide separation devices may be used together with a fuel cell system, such as a solid oxide fuel cell system. Additional embodiments illustrate integrated power generation, carbon dioxide separation and downstream processing systems. Additional embodiments illustrate a system in which a $CO_2$-separating solid oxide fuel cell (SOFC) power generator is integrated with downstream equipment which permits a continued operation of the SOFC power generator in the presence of the downstream equipment. It should be noted that other fuel cell systems, such as molten carbonate systems, may also be used.

Figure 1A:
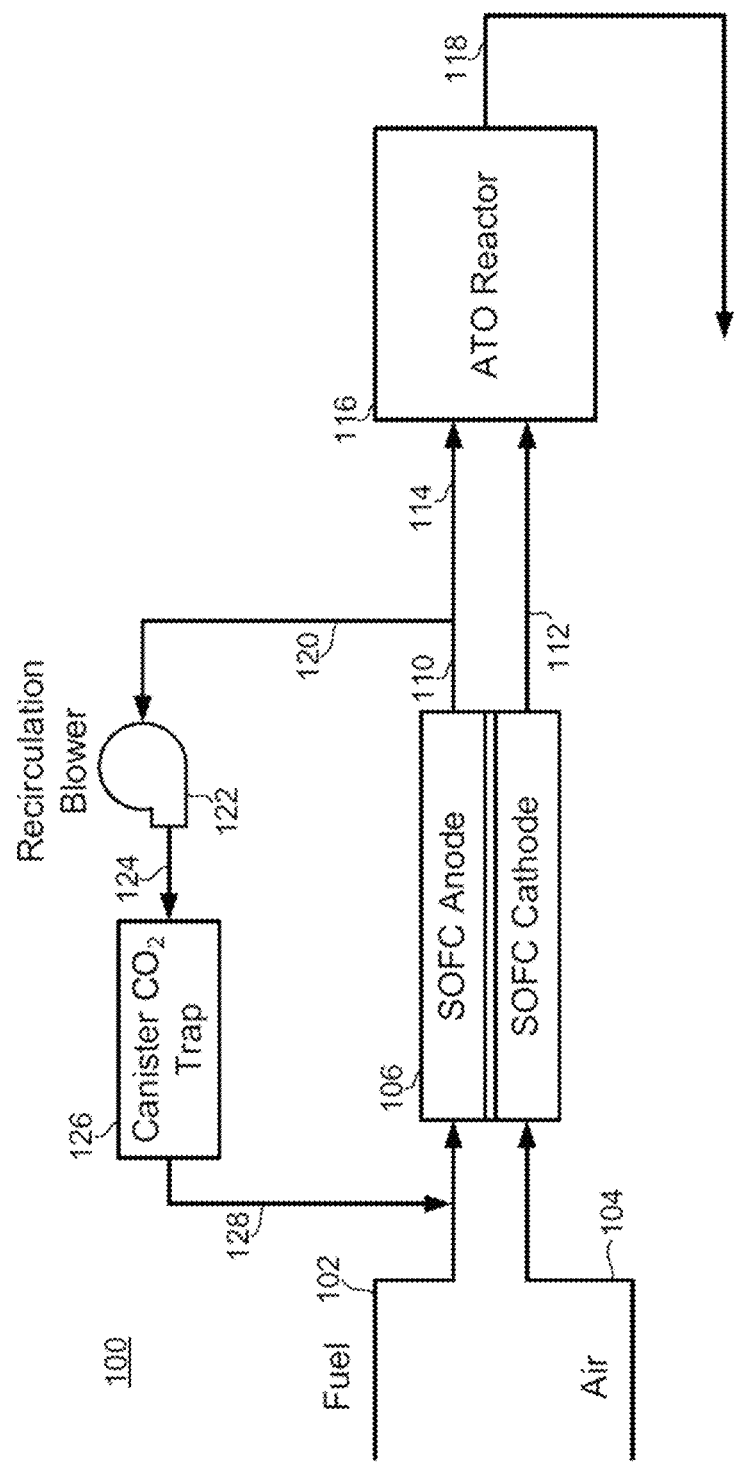
FIG. 1A is a schematic of a fuel cell system according to an embodiment of the present invention.

FIG. 1A illustrates a fuel cell system 100 according to one embodiment of the present invention. Preferably, the system 100 is a high temperature fuel cell stack system, such as a solid oxide fuel cell (SOFC) system. The system 100 may be a regenerative system such as a solid oxide regenerative fuel cell (SORFC) system which operates in both fuel cell (i.e., discharge or power generation) and electrolysis (i.e., charge) modes or it may be a non-regenerative system which only operates in the fuel cell mode.

The system 100 contains a high temperature fuel cell stack 106. The stack may contain a plurality of SOFCs or SORFCs. The high temperature fuel cell stack 106 is illustrated schematically to show one solid oxide fuel cell of the stack containing a ceramic electrolyte, such as yttria or scandia stabilized zirconia, an anode electrode, such as a nickel-stabilized zirconia cermet, and a cathode electrode, such as lanthanum strontium manganite. Each fuel cell contains an electrolyte, an anode electrode on one side of the electrolyte anode chamber, a cathode electrode on the other side of the electrolyte in a cathode chamber, as well as other components, such as separator plates/electrical contacts, fuel cell housing and insulation. In an SOFC operating in the fuel cell mode, the oxidizer, such as air or oxygen gas, enters the cathode chamber, while the fuel, such as hydrogen or hydro-carbon fuel, enters the anode chamber. Any suitable fuel cell designs and component materials may be used. The system 100 further contains an anode tail gas oxidizer (ATO) reactor 116, a recirculation blower 122, and a canister carbon dioxide trap 126.

The system 100 operates as follows. The fuel inlet stream is provided into the fuel cell stack 106 through fuel inlet conduit 102. The fuel may comprise any suitable fuel, such as a hydrogen fuel or a hydrocarbon fuel, including but not limited to methane, natural gas which contains methane with hydrogen and other gases, propane or other biogas, or a mixture of a carbon fuel, such as carbon monoxide, oxygenated carbon containing gas, such as methanol, or other carbon containing gas with a hydrogen containing gas, such as water vapor, hydrogen gas or other mixtures. For example, the mixture may comprise syngas derived from coal or natural gas reformation. The fuel inlet conduit 102 provides the fuel inlet stream to the anode side of the fuel cell stack 106.

Air or another oxygen containing gas is provided into the stack 106 through an air inlet conduit 104. The air inlet conduit 104 provides air to the cathode side of the fuel cell stack 106.

Once the fuel and oxidant are provided into the fuel cell stack 106, the stack 106 is operated to generate electricity and a fuel exhaust stream. The fuel exhaust stream may contain hydrogen, water vapor, carbon monoxide, carbon dioxide, some un-reacted hydrocarbon gas, such as methane, and other reaction by-products and impurities.

The fuel exhaust stream (i.e., the stack anode exhaust stream) is provided from the stack 106 via fuel exhaust conduit 110. The air exhaust stream (i.e., the stack cathode exhaust stream) is provided from the stack air exhaust outlet via air exhaust conduit 112. The fuel exhaust conduit 110 is configured to provide a portion of the fuel exhaust stream to the ATO reactor 116 via ATO input conduit 114 and recycle a portion of the fuel exhaust stream via recycling conduit 120. The portion of fuel exhaust provided to the ATO reactor 116 and recycled via recycling conduit 120 may vary. For example, 10% of the fuel exhaust may be provided to the ATO reactor 116 and 90% recycled. Alternatively, 50% of the fuel exhaust may be provided to the ATO reactor 116, while 50% is recycled. Additionally, 90% of the fuel exhaust or more may be provided to the ATO reactor, while 10% or less is recycled. The amount of recycled fuel provided into conduit 120 is controlled by blower 122 power or blowing speed. The fuel exhaust stream provided into conduits 114 and 120 may contain the same composition or content of hydrogen, carbon monoxide, water, and carbon dioxide. Air exhaust conduit 112 is configured to provide the air exhaust stream to the ATO reactor 116.

The ATO reactor 116 receives the fuel exhaust stream and air exhaust stream via ATO input conduit 114 and conduit 112, respectively. The ATO reactor uses the combined fuel exhaust stream and air exhaust stream to oxidize anode tail gas and output heated oxidized fuel (i.e., reactor exhaust) to ATO exhaust conduit 118.

A recirculation blower 122 is coupled to recycling conduit 120 to provide the recycled fuel exhaust stream from recycling conduit 120 to a carbon dioxide canister trap 126 via recycling conduit 124. The recirculation blower 122 may be computer or operator controlled and may vary the amount and/or rate of the recycled fuel exhaust stream being provided to the carbon dioxide canister trap 126 and also the amount and/or rate of the carbon dioxide free or carbon dioxide depleted recycled fuel exhaust stream being provided back to the stack 106. As such, the recirculation blower 122 may be used to increase or decrease the overall recycling rate in system 100.

The carbon dioxide canister trap 126 may be any type carbon dioxide trap, such as a consumable carbon dioxide trap. The carbon dioxide canister trap 126 has no carbon dioxide conduit. Instead, the carbon dioxide canister trap 126 is physically removed from the SOFC system by an operator when it fills up with carbon dioxide and is replaced with a clean trap. The carbon dioxide canister trap 126 may be placed downstream of the recirculation blower 122 and may be used to extend hotbox life so long as the carbon dioxide canister trap 126 may be routinely replaced. The carbon dioxide canister trap 126 removes carbon dioxide from the recycled fuel exhaust stream. Preferably, the carbon dioxide canister trap 126 removes substantially all the carbon dioxide from the recycled fuel exhaust stream. The carbon dioxide canister trap 126 may remove less than 50%, or more than 50%, such as 50% to 60%, 60% to 70%, 70% to 80%, 80% to 90%, or 90% to 100%, such at about 98%, about 99%, or about 99.5% of the carbon dioxide from the recycled fuel exhaust stream. The carbon dioxide canister trap 126 may require daily change out of its carbon dioxide gathering components, or other suitable change out periodicity may be required. Bypass valve and conduit (not shown) may be provided to allow carbon dioxide canister trap 126 replacement of without power generation interruption. Preferably the carbon dioxide canister trap 126 is located outside of the hot box containing the fuel stack 106 for easy access for service personnel. Carbon dioxide canister trap 126 may be located in system housing containing the hot box.

Figure 1B:
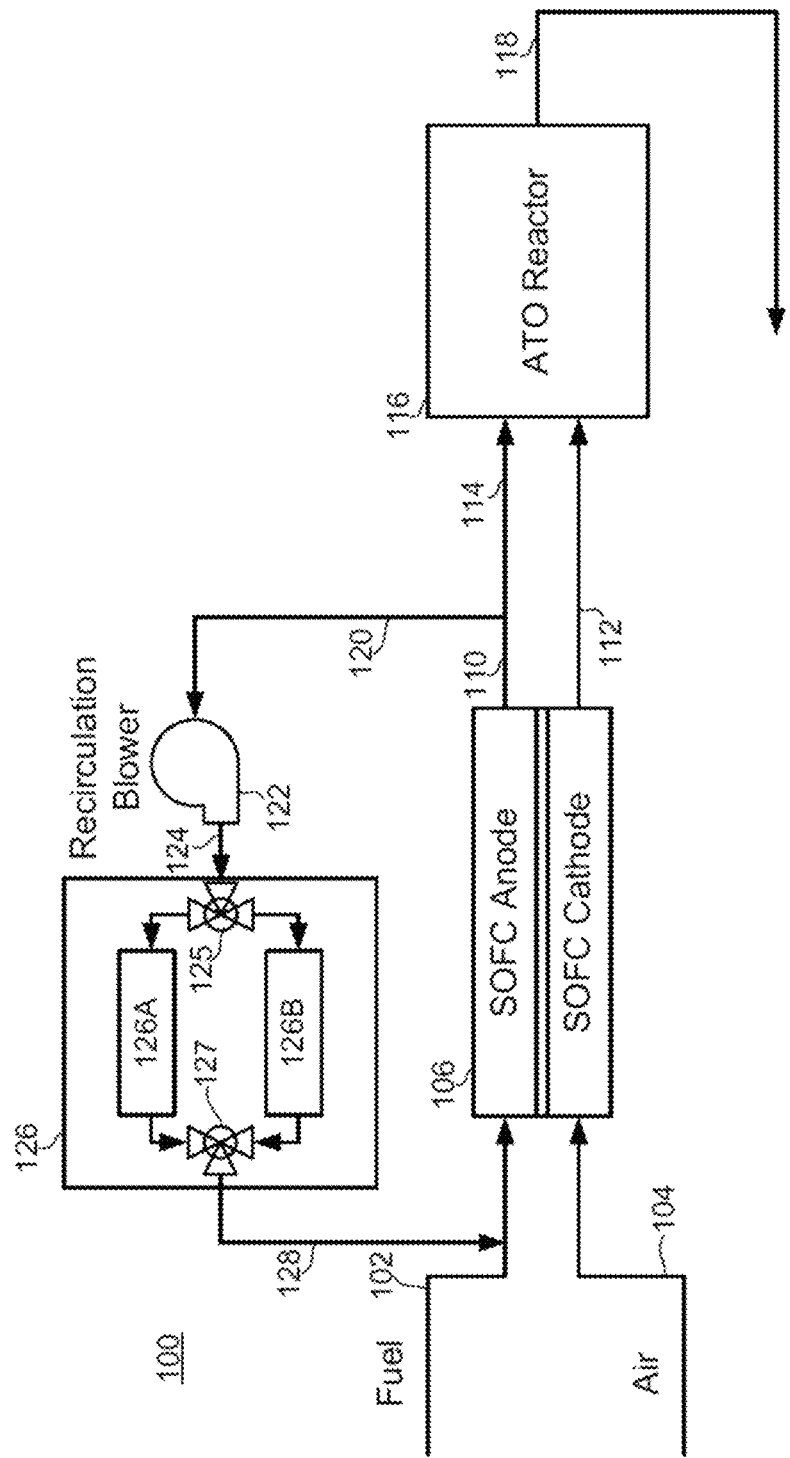
FIG. 1B is a schematic of a carbon dioxide separator of FIG. 1A.

FIG. 1B illustrates a schematic of a carbon dioxide canister trap 126 of FIG. 1A. The carbon dioxide canister trap 126 is shown in greater detail in FIG. 1B. The carbon dioxide canister trap 126 may be comprised of two carbon dioxide canister traps 126A and 126B. A valve 125 may be provided to allow the diversion of the recycled fuel exhaust stream from recycling conduit 124 to one or both of carbon dioxide canister traps 126A or 126B. Additionally, the valve 125 may prevent the recycled fuel exhaust stream from flowing to one or both of carbon dioxide canister traps 126A and 126B. Carbon dioxide canister traps 126A and 126B remove carbon dioxide from the recycled fuel exhaust stream. A valve 127 may be provided to allow the isolation of carbon dioxide canister traps 126A and 126B from recycling conduit 128. The operation of valve 125 and valve 127 may allow a system operator to pass recycled fuel exhaust to one, both, or neither of the carbon dioxide canister traps 126A and 126B at the same time. Valve 125 and valve 127 may be configured to isolate either carbon dioxide canister trap 126A and 126B from system 100. In other words, carbon dioxide canister trap 126B may be isolated and replace while carbon dioxide trap 126A continues to function, and vice versa. This isolation may facilitate trap change out or other maintenance or regulate the rate of carbon dioxide removal without power generation interruption.

As illustrated in both FIGS. 1A and 1B the purified recycled fuel exhaust stream, with a reduced amount of carbon dioxide, is provided back to the fuel inlet stream for the fuel stack 106 via recycling conduit 128. The recycling of carbon dioxide depleted fuel exhaust into the fuel inlet increases the performance of the fuel cell stack 106.

Figure 2:
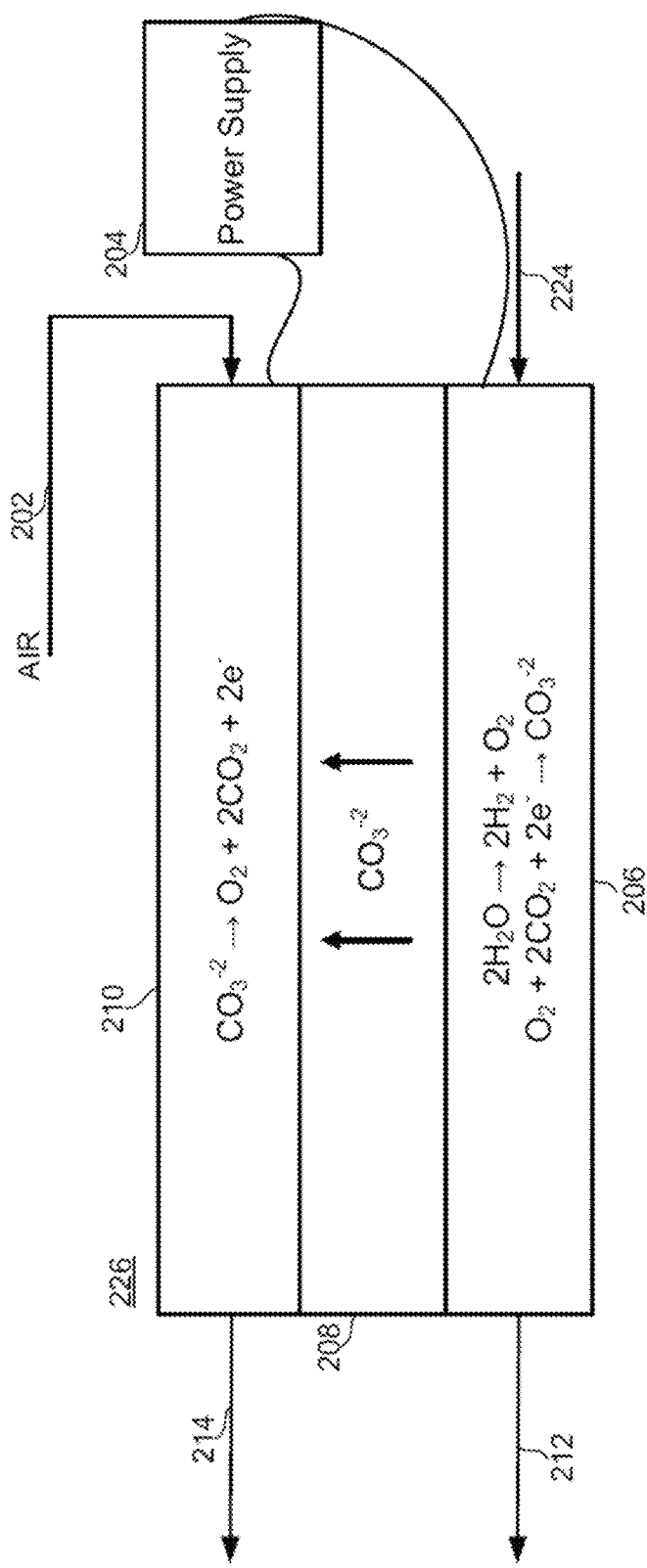
FIG. 2 is a schematic of a carbon dioxide separator capable of use with the embodiments of the present invention.

FIG. 2 illustrates an electrochemical carbon dioxide separator 226 according to another embodiment of the present invention. The electrochemical carbon dioxide separator 226 is one type of carbon dioxide separator which may be used with embodiments of the present invention. The electrochemical carbon dioxide separator 226 may be a molten carbonate fuel cell operated in electrolysis mode (i.e., with applied potential).

The electrochemical carbon dioxide separator 226 may receive a recycled fuel exhaust stream input via recycling conduit 224. The recycled fuel exhaust stream may consist of hydrogen, carbon dioxide, water, and carbon dioxide. The recycling conduit 224 may be coupled to the anode 206 chamber of the electrochemical carbon dioxide separator 226. Air is provided to the electrochemical carbon dioxide separator 226 via air input conduit 202 and used to purge the electrochemical carbon dioxide separator 226. Electricity is applied to the electrochemical carbon dioxide separator 226 from a power supply 204 to operate electrochemical carbon dioxide separator in electrolyzer mode. In an embodiment, the power supply 204 may comprise the fuel cell stack 106. The current applied transfers carbonate ions ($CO_3^{-2}$) from the anode 206, through the electrolyte 208, to the cathode 210 according to the following reaction:

Anode: $2H_2O \rightarrow 2H_2 + O_2$  $O_2 + 2CO_2 + 2e^- \rightarrow CO_3^{-2}$ Cathode: $CO_3^{-2} \rightarrow O_2 + 2CO_2 + 2e^-$ The cathode 210 chamber is coupled to a carbon dioxide conduit 214 and carbon dioxide extracted from the recycled fuel exhaust stream exits the electrochemical carbon dioxide separator 226 via the carbon dioxide conduit 214.

The anode 206 chamber is further coupled to a purified recycled fuel exhaust stream conduit 212. Purified recycled fuel exhaust stream exiting the carbon dioxide separator anode 206 chamber via the purified anode exhaust conduit 212 contains less carbon dioxide than the recycled fuel exhaust stream that entered the carbon dioxide separator 226 via the recycling conduit 224. As a percentage of overall composition, the purified recycled fuel exhaust stream in the purified recycled fuel exhaust stream conduit 212 contains a greater percentage of hydrogen than the recycled fuel exhaust stream entering the carbon dioxide separator 206 via recycling conduit 224. Preferably, the electrochemical carbon dioxide separator 226 removes substantially all the carbon dioxide from the recycled fuel exhaust stream. The electrochemical carbon dioxide separator 226 may remove less than 50%, or more than 50%, such as 50% to 60%, 60% to 70%, 70% to 80%, 80% to 90%, or 90% to 100%, such at about 98%, about 99%, or about 99.5% of the carbon dioxide from the recycled fuel exhaust stream.

Figure 3:
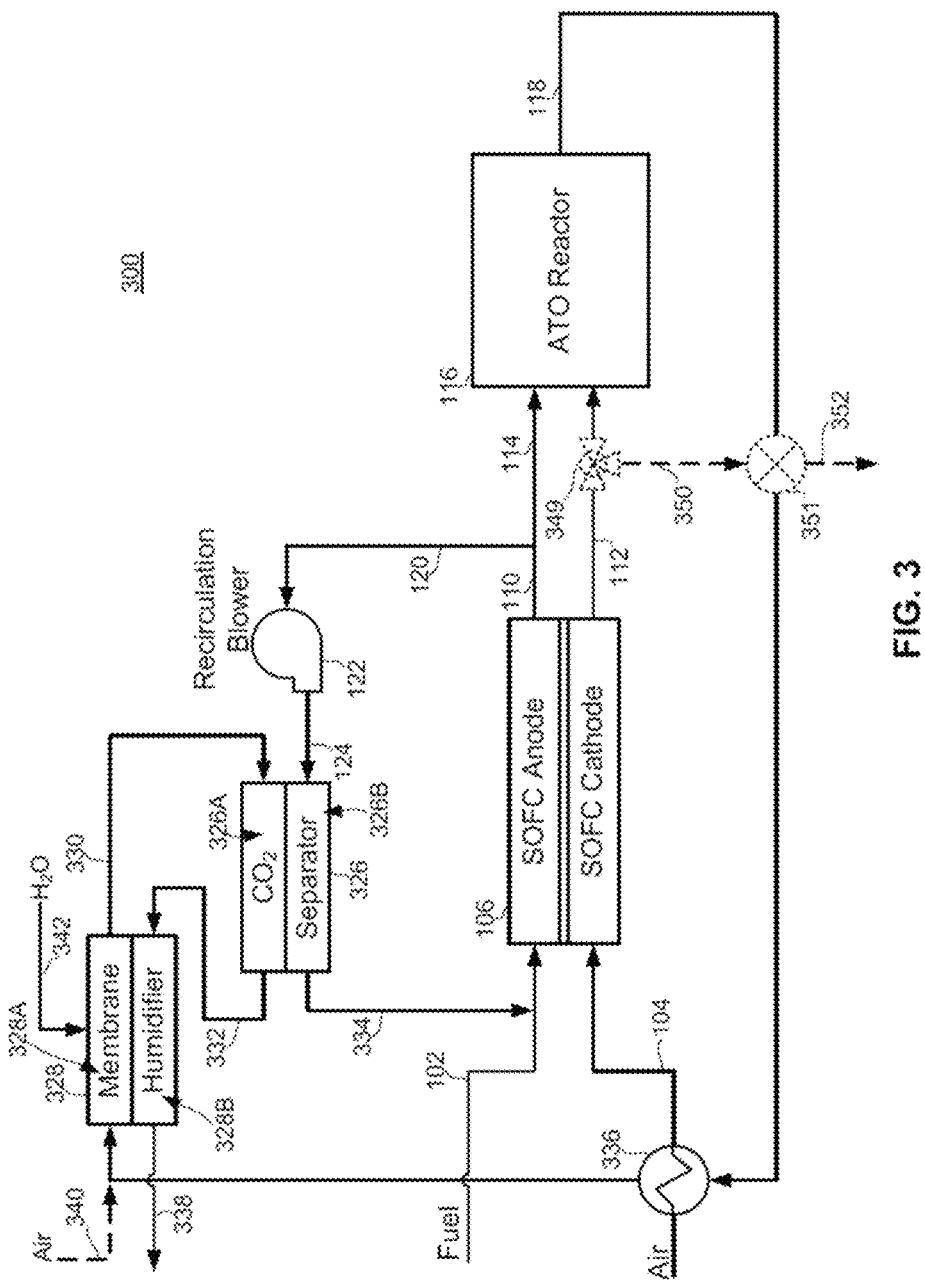
FIGS. 3 and 4 are schematics of fuel cell systems according to embodiments of the present invention.

FIG. 3 illustrates a system 300 according to an embodiment of the invention. The system 300 is similar to system 100 illustrated in FIG. 1A and contains a number of components in common. Those components which are common to both systems 100 and 300 are numbered with the same numbers in FIGS. 1A and 3 and will not be described further.

One difference between systems 100 and 300 is that system 300 may utilize a carbon dioxide separator 326 as opposed to a carbon dioxide canister trap 126. The carbon dioxide separator 326 may be any type carbon dioxide separator, such as a carbon dioxide membrane separator or an electrochemical carbon dioxide separator as discussed in relation to FIG. 2 above. Another difference between systems 100 and 300 is that system 300 may utilize ATO exhaust or SOFC cathode exhaust to sweep the collection side of the carbon dioxide separator 326 to remove carbon dioxide. An additional difference between systems 100 and 300 is that system 300 may bias the carbon dioxide separator 326 collection side gas with water.

Recycling conduit 124 may be coupled to the carbon dioxide separator 326. The recycled fuel exhaust stream is input to the carbon dioxide separator 326 via the recycling conduit 124, and carbon dioxide is removed from the recycled fuel exhaust stream to produce a purified (e.g., carbon dioxide depleted) recycled fuel exhaust stream. The purified recycled fuel exhaust stream exiting the carbon dioxide separator 326 contains less carbon dioxide than the recycled fuel exhaust stream that entered the carbon dioxide separator 326 via the recycling conduit 124. As a percentage of overall composition the purified recycled fuel exhaust stream contains a greater percentage of hydrogen than the recycled fuel exhaust stream entering the carbon dioxide separator 326 via recycling conduit 124. Preferably, the carbon dioxide separator 326 removes substantially all the carbon dioxide from the recycled fuel exhaust stream. The carbon dioxide separator 326 may remove less than 50%, or more than 50%, such as 50% to 60%, 60% to 70%, 70% to 80%, 80% to 90%, or 90% to 100%, such at about 98%, about 99%, or about 99.5% of the carbon dioxide from the recycled fuel exhaust stream.

The carbon dioxide separator 326 is coupled to recycling conduit 334. The purified recycled fuel exhaust stream, with a reduced amount of carbon dioxide, is provided back to the fuel inlet stream by the recycling conduit 334. The recycling of reduced carbon dioxide fuel exhaust into the fuel inlet increases the performance of the fuel cell stack 106.

The efficiency of the carbon dioxide separator 326 at selecting for carbon dioxide is increased by the biasing of the collection side of the carbon dioxide separator 326 by adding water to the collection side of the carbon separator 326.

In one embodiment, the hot exhaust from the ATO reactor 116 is passed via hot exhaust conduit 118 to a cathode recuperator heat exchanger 336 where the ATO exhaust exchanges heat with the air inlet stream provided through air inlet conduit 104. The heat exchanger helps to raise the temperature of the air in air inlet conduit 104 and reduces the temperature of the ATO exhaust in conduit 118 such that it does not damage the membrane humidifier 328.

In an alternative embodiment, all or a portion of the SOFC cathode exhaust may be passed directly to the cathode recuperator heat exchanger 336. A valve 349 may direct cathode exhaust from conduit 112 to conduit 350. Valve 349 may alternatively be a splitter (not shown) configured to direct a portion of the cathode exhaust to conduit 350 and a portion of the cathode exhaust to the ATO reactor. Valve 351 may be configured to direct the cathode exhaust received from conduit 350 toward the cathode recuperator heat exchanger 336 and prevent cathode exhaust from flowing to the ATO reactor 116. Additionally, valve 351 may be coupled to a conduit 352 to direct ATO exhaust and/or SOFC cathode exhaust out of the system 300 as exhaust. The utilization of valves 349 and 351 and conduit 350 may allow either SOFC cathode exhaust or ATO exhaust, a mixture of both ATO exhaust and SOFC cathode exhaust, or neither ATO exhaust nor SOFC cathode exhaust to pass to the cathode recuperator heat exchanger 336.

From the heat exchanger 336, the ATO exhaust conduit 118 may be coupled to a membrane humidifier 328. Air is input to the membrane humidifier 328 via conduit 118. Optionally, air may also be input to the membrane humidifier as via air conduit 340 coupled to the membrane humidifier 328. Air conduit 340 may input air supplied by a blower, fan, or compressor (not shown).

In operation, the membrane humidifier 328 humidifies an air or oxidized fuel stream for input into the carbon dioxide separator 326. The membrane humidifier 328 may comprise a polymeric membrane humidifier.

Water may be input to the membrane humidifier 328 via a water conduit 342 as necessary. Water is also may be collected by the membrane humidifier 328 from the carbon dioxide conduit 332, which is coupled between the carbon dioxide separator 326 and the membrane humidifier 332. The water permeates across the membrane from product side 328B to collection side 328A of membrane humidifier 328. The water from the conduit 342 is mixed in the membrane humidifier 328 with the ATO exhaust from conduit 118 and the now humid air passes to humid air conduit 330.

Humid air conduit 330 is coupled to the carbon dioxide separator 326 and the humid air or ATO exhaust is used to bias the separation of carbon dioxide by the carbon dioxide separator 326. Where a traditional carbon dioxide separator naturally selects for water in a reaction, the presence of water on the collection side of the carbon dioxide separator reduces the selection of water and increases the efficiency of the carbon dioxide separator to select for carbon dioxide. In this manner the increased amount of water in the air entering the collection side of the carbon dioxide separator 326 biases the carbon dioxide separator 326 to select for carbon dioxide from the recycled fuel exhaust stream. Preferably, the humid air or ATO exhaust contains a substantially equal amount of water as the recycled fuel exhaust stream. The humid air or ATO exhaust may contain about 90%, 80%, 70%, 60%, 50%, 40%, 30%, 20%, or 10% of the water contained in the recycled fuel exhaust stream. The term "about" provides a variation based on given processes variables, such as a variation of 10% or less, preferably 5% or less. The humid air or ATO exhaust may also contain more than 100% of the water contained in the recycled fuel exhaust stream, such as about 110%, 120%, 130%, 140%, 150%, 160%, 170%, 180%, 190%, or 200%.

Thus conduit 330 inputs a humid mix into the collection side 326A and conduit 332 outputs a carbon dioxide and humid mix from the collection side 326A of carbon dioxide separator 326. Conduit 124 inputs the recycled fuel exhaust into the product side 326B and conduit 334 outputs carbon dioxide depleted exhaust from the product side 326B of carbon dioxide separator 326.

Thus, conduits 340 and/or 118 provide an oxidizer to the collection side 328A and conduit 330 outputs a humidified oxidizer from the collections side 328A of membrane humidifier 328. Conduit 332 inputs carbon dioxide and humid mix into product side 328B and conduit 338 outputs carbon dioxide and from the product side 328B.

The humid air or ATO exhaust and carbon dioxide mixture travels from the collection side of the carbon dioxide separator via carbon dioxide conduit 332 to the membrane humidifier 328. The membrane humidifier 328 removes a portion of the water from the humid air mixture, and outputs carbon dioxide and air via output conduit 338. As discussed above, the water removed from the carbon dioxide conduit 332 by the membrane humidifier 328 may be used to humidify air or ATO exhaust entering the membrane humidifier 328. Thus, system 300 uses ATO exhaust or SOFC cathode exhaust to sweep the carbon dioxide separator collection side and/or to bias the collection gas with water.

Figure 4:
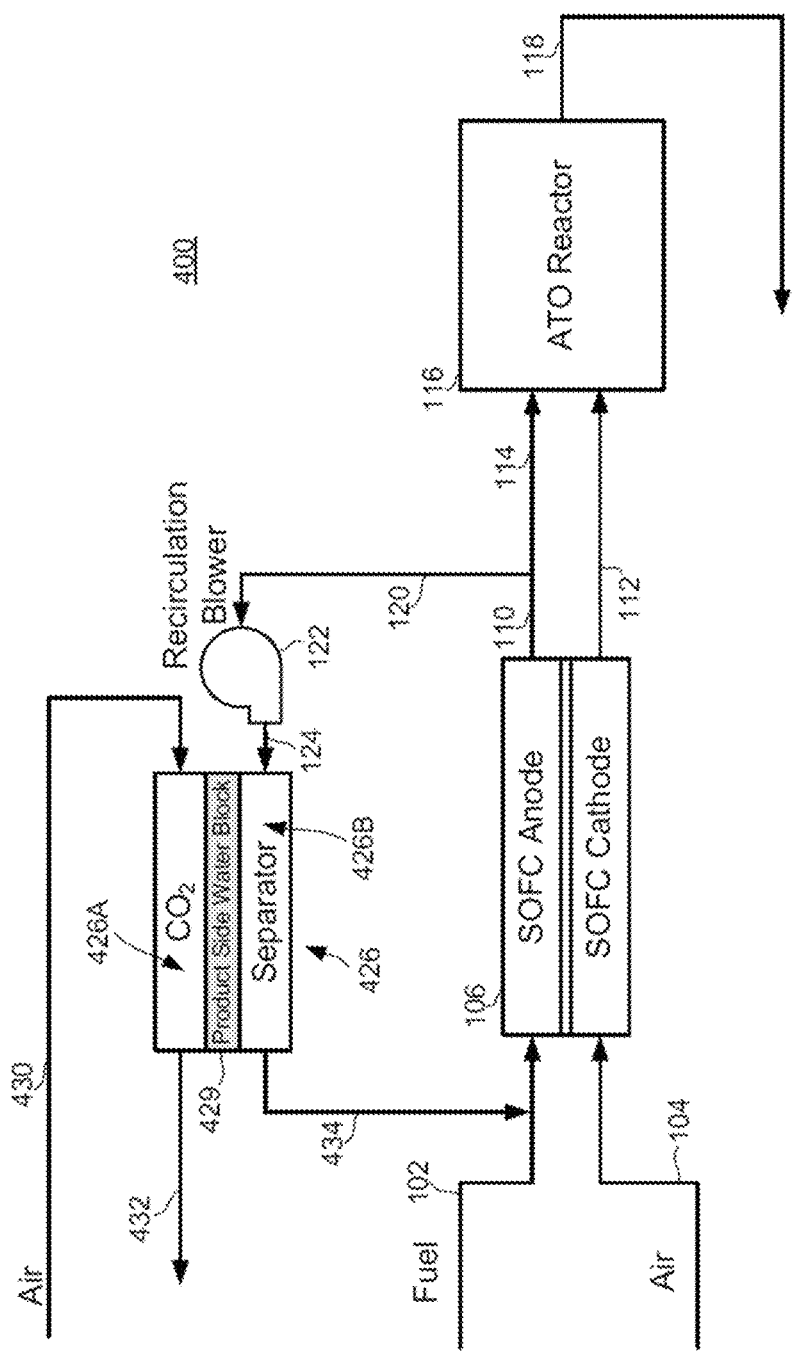

FIG. 4 illustrates a system 400 according to an embodiment of the invention. The system 400 is similar to system 100 illustrated in FIG. 1A and contains a number of components in common. Those components which are common to both systems 100 and 400 are numbered with the same numbers in FIGS. 1A and 4 and will not be described further.

One difference between systems 100 and 400 is that system 400 may utilize a carbon dioxide membrane separator 426 as opposed to a carbon dioxide canister trap 126.

A carbon dioxide membrane separator 426 may be a carbon dioxide membrane separator constructed with tailored membrane structure 429 to block water transport from the product side 426B (input side) to the collection side 426A of the carbon dioxide membrane separator. The tailored membrane structure, (the product side water block) 429 may be constructed of a material which allows carbon dioxide to pass, but will not allow water to pass. One such material which has been found to be effective for product side water block construction is polytetrafluoroethylene (Teflon®). The product side water block impedes water transport via accumulation or blockage into the purging air of the carbon dioxide membrane separator. The carbon dioxide membrane separator 426 may be constructed in a manner similar to an electrochemical carbon dioxide separator, but does not require the input of electrical current to operate.

Recycling conduit 124 may be coupled to the carbon dioxide membrane separator 426. The recycled fuel exhaust stream enters the product side 426B of the carbon dioxide membrane separator 426 via recycling conduit 124. The carbon dioxide membrane separator removes carbon dioxide from the recycled fuel exhaust stream. As previously discussed, the product side water block 429 of the carbon dioxide membrane separator impedes the transport of water, so only carbon dioxide is collected by the carbon dioxide membrane separator 426 on the collection side 426A. Preferably, the carbon dioxide membrane separator 426 removes substantially all the carbon dioxide from the recycled fuel exhaust stream. The carbon dioxide membrane separator 426 may remove less than 50% or greater than 50%, such as 50% to 60%, 60% to 70%, 70% to 80%, 80% to 90%, or 90% to 100%, such as about 98%, about 99%, or about 99.5% of the carbon dioxide from the recycled fuel exhaust stream.

The purified recycled fuel exhaust stream exiting the collection side 426A of the carbon dioxide membrane separator 426 contains less carbon dioxide than the recycled fuel exhaust stream that entered the product side 426B of the carbon dioxide separator 426 via the recycling conduit 124. As a percentage of overall composition the purified recycled fuel exhaust stream contains a greater percentage of hydrogen than the recycled fuel exhaust stream entering the carbon dioxide separator 426 via recycling conduit 124.

The product side 426B of the carbon dioxide membrane separator 426 is coupled to recycling conduit 434. The purified recycled fuel exhaust stream, with a reduced amount of carbon dioxide, is provided back to the fuel inlet stream by the recycling conduit 434. The recycling of reduced carbon dioxide fuel exhaust into the fuel inlet increases the performance of the fuel cell stack 106.

Purge air is provided to the collection side 426A of the carbon dioxide membrane separator 426 via air conduit 430 which is operatively coupled to the collection side 426A of the carbon dioxide membrane separator 426. Purge air removes carbon dioxide from the collection side 426A of the carbon dioxide membrane separator 426. The carbon dioxide membrane separator 426 is operatively coupled to output conduit 432 and the air and carbon dioxide mixture flows from the collection side 426A of the carbon dioxide membrane separator 426 to the output conduit 432.

FIGS. 5 to 9B are schematics of integrated power generation, carbon dioxide separation and downstream processing systems according to embodiments of the present invention. In some embodiment, the power generation system is a fuel cell system which can separate $CO_2$ in its anode exhaust stream, such as the fuel cell systems 100 through 400 described in any one or more prior embodiments above and illustrated in FIGS. 1A to 4. Other suitable power generation systems, such as other fuel cell systems may also be used. The fuel cell system is integrated with downstream equipment for $CO_2$ processing. According to various embodiments, the systems and methods provide for the direct downstream processing, use, and/or storage of the $CO_2$ provided from fuel cell system exhaust.

Downstream Applications and/or $CO_2$ Storage

Figure 5:
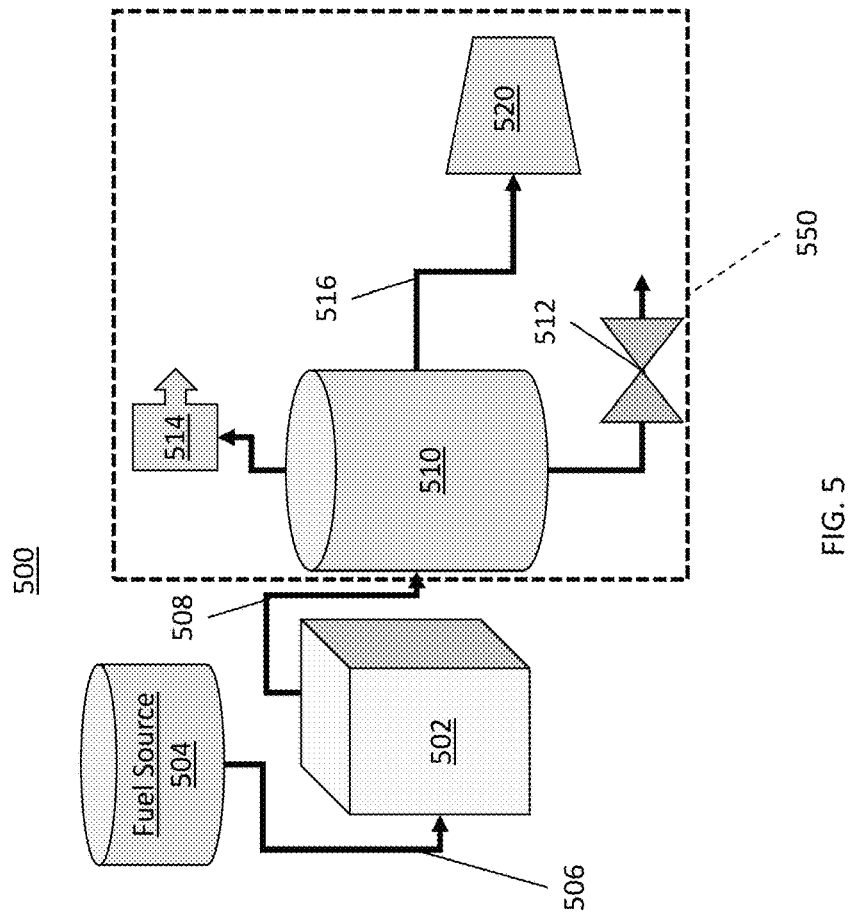
FIG. 5 is a schematic view of an integrated fuel cell power generation and $CO_2$ processing system, according to various embodiments of the present disclosure.

FIG. 5 is a schematic view of an integrated fuel cell power generation and $CO_2$ processing system 500, according to various embodiments of the present disclosure. Referring to FIG. 5, the system 500 allows for the direct processing of the $CO_2$ in a downstream process that transforms the $CO_2$ from a gaseous state into another product which either has higher value or more dense and stable storage of the $CO_2$.

In particular, the system includes a fuel cell system 502, such as a SOFC power generation system configured to operate using a hydrocarbon fuel, such as natural gas or higher hydrocarbons. For example, the fuel cell system 502 may comprise any of the systems 100, 200, 300 or 400 described above, or another fuel cell system containing a carbon dioxide separator. The fuel cell system 502 may be fluidly connected to a fuel source 504, such as a fuel tank or a gas line (e.g., natural gas line) by a fuel conduit 506.

The system 500 may also include an exhaust processing system 550 including a reservoir (e.g., receiving tank or accumulator) 510 and a $CO_2$ processor 520, such as a $CO_2$ sequestration system and/or compressor. The reservoir 510 may be fluidly connected directly downstream of the fuel cell system 502, so as to receive exhaust output directly from the fuel cell system 502. For example, an exhaust conduit 508 may fluidly connect an anode exhaust outlet of the fuel cell system 502 (e.g., the outlet of a carbon dioxide separator fluidly connected to a fuel cell stack anode exhaust) to the reservoir 510.

In particular, the fuel cell system 502 may be configured to output an exhaust stream that contains $CO_2$ and water and little or no nitrogen. For example, the exhaust stream may be output from a fuel cell system $CO_2$ separator, as described above. In other words, unlike conventional fuel cell systems, the exhaust stream may be free or essentially free of nitrogen ($N_2$) (e.g., contains less that about 5% by volume $N_2$, such as less than about 1% by volume, or less than about 0.5% by volume $N_2$).

The reservoir 510 may fluidly connected to the $CO_2$ processor 520 by the exhaust conduit 516, such that exhaust contained in the reservoir 510 may be provided to the $CO_2$ processor 520. Accordingly, the exhaust (e.g., carbon dioxide separated from the anode exhaust of the fuel cell system) may flow from the fuel cell system 502, to the reservoir 510, and then to the $CO_2$ processor 520.

Exhaust backpressure may reduce the efficiency of the fuel cell system 502. As such, the reservoir 510 may be configured to buffer the effects of exhaust backpressure generated by downstream components, such as the $CO_2$ processor 520. For example, the $CO_2$ processor 520 may include elements that generate backpressure and/or backpressure pulses during operation. The reservoir 510 may operate to reduce and/or prevent such backpressure from being applied to the fuel cell system 502. In other words, the reservoir 510 may operate to isolate the fuel cell system 502 from pressure variations generated by downstream components.

In some embodiments, the reservoir 502 may include internal baffles and/or a pressure-absorbing media to further reduce the effects of backpressure on the generator 502. In other embodiments, the reservoir 502 may be configured to cool the exhaust stream. For example, the reservoir 510 may be integrated with an external or internal cooling system, such as cooling coils and/or heat exchangers.

In some embodiments, the reservoir 510 may be configured to cool the exhaust using cooling water spray or mist. The system 500 may optionally include a drain valve 512 fluidly connected to the reservoir 510. The drain valve 512 may be periodically opened to release water from the reservoir 510.

The system 500 may optionally include a relief valve 514 fluidly connected to the reservoir 510. The relief valve 512 may be configured to release exhaust from the reservoir 510, if the exhaust pressure within the reservoir 510 exceeds a set value. For example, the relief valve 514 may be configured to open if the pressure in the reservoir 510 approaches a pressure limit of the fuel cell system 502.

Flow Measurement Feed-Forward

Figure 6:
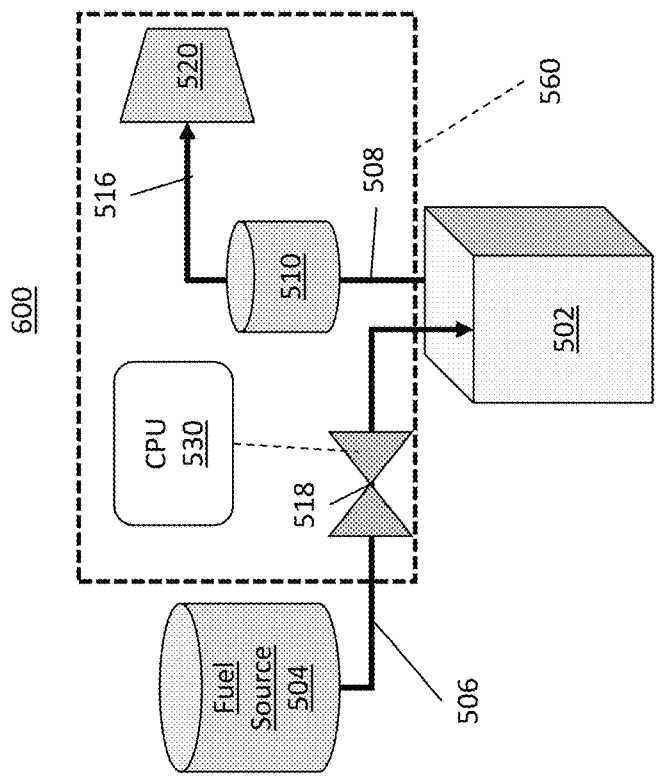
FIG. 6 is a schematic diagram of an integrated fuel cell power generation and $CO_2$ processing system, according to various embodiments of the present disclosure.

FIG. 6 is a schematic diagram of an integrated fuel cell power generation and $CO_2$ processing system 600 according to various embodiments of the present disclosure. The system 600 may be similar to the system 500 of FIG. 5, and as such, similar elements are not described in detail.

Referring to FIG. 6, the system 600 may include the fuel cell system 502 and an exhaust processing system 560 configured to measure $CO_2$ output based on fuel flow. The processing system 560 may include, a fuel sensor, such as fuel measurement valve 518, disposed on the fuel conduit 506 fluidly connecting the fuel cell system 502 to the fuel source 504, such as a fuel tank or pipeline. The exhaust conduit 516 may be configured to fluidly connect an exhaust outlet of the fuel cell system 502 to the $CO_2$ processor 520. The processing system 560 may optionally include the reservoir 510 described above.

The fuel measurement valve 504 may be configured to measure an amount and/or composition (e.g., grade, etc.) of fuel that is input to the fuel cell system 502. The sensor, such as the fuel measurement valve 518 may be wired or wirelessly connected to a central processing unit (CPU) 530 that may be utilized to determine an amount of $CO_2$ and/or $H_2O$ present in the exhaust output from the fuel cell system 502 based on the measurement of the fuel input into the fuel cell system 502 The CPU 530 may be configured to determine a revenue grade measurement of the fuel inlet stream, such that $CO_2$ output measurements may be made for financial reasons, such as $CO_2$ credit calculation. For example, the CPU 530 may determine the fuel type (e.g., grade, chemical composition, etc.) and/or the amount of fuel (e.g., if the type of fuel provided is known) passing through the sensor 518. The CPU 530 may then calculate the amount and/or flow rate of carbon dioxide that will be provided from the fuel cell system 502 to the $CO_2$ processor 520 based on known or sensed operating parameters of the fuel cell system 502 (e.g., operating temperature, steam to carbon ratio, fuel to air ratio, fuel utilization, carbon dioxide separator efficiency and/or throughput, etc.). Accordingly, the system 600 may utilize upstream fuel measurement to determine the downstream flow of $CO_2$.

The advantage of this embodiment is that an additional downstream measurement of the $CO_2$ content of the exhaust stream, which is a wet exhaust stream that includes both $H_2O$ and $CO_2$ may be avoided. It may be beneficial to avoid measuring the $CO_2$ content of such a wet exhaust stream, because flow measurement devices capable of measuring a wet gas stream can fail, such that it may create downstream back-pressure on the fuel cell system 502 if above a threshold amount of carbon dioxide is provided to the $CO_2$ processor 520, which may result in rapid system degradation or failure.

In the embodiments of FIGS. 5 and 6, the systems 500, 600 include a reservoir 510 configured to receive exhaust output from the fuel cell system 502, and a compressor 520 configured to compress exhaust output from the reservoir 510, such that the reservoir 510 is configured to reduce an amount of exhaust backpressure applied to the fuel cell system 502.

In the system 500 of the embodiment of FIG. 5, the reservoir 510 comprises a relief valve 514 configured to prevent the exhaust backpressure in the reservoir from exceeding a preset level. The preset level is less than an amount of pressure that would damage the fuel cell system 502. In one embodiment, the reservoir 510 comprises internal baffles configured to reduce the amount of exhaust backpressure applied to the fuel cell system 502. In another embodiment, the exhaust processing system 550 further comprises a cooling system configured to reduce the temperature of the exhaust in the reservoir 510.

In the system 600 of the embodiment of FIG. 6, the exhaust processing system 560 comprises a sensor 518 configured to measure a characteristic of a fuel that is provided to the fuel cell system, and a central processing unit 530 configured to determine an amount of $CO_2$ in the exhaust output from the fuel cell system 502 based on a measurement by the sensor.

The fuel cell system 502 may comprise a solid oxide fuel cell stack configured to generate the power, and a carbon dioxide separation device described with respect to any of FIGS. 1A to 4 configured to separate the $CO_2$ included in the exhaust output from the fuel cell system.

$CO_2$ Conversion to Solid $CaCO_3$

Figure 7:
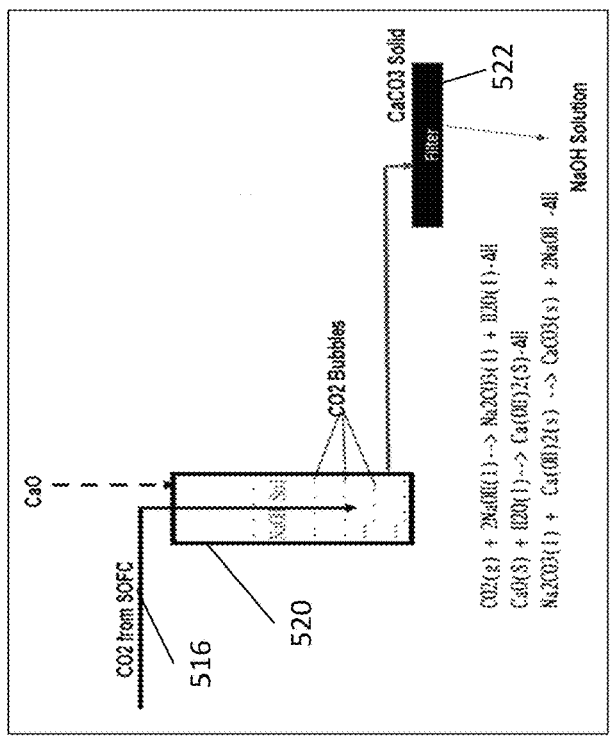
FIG. 7 is a schematic view of a $CO_2$ fixation process, according to various embodiments of the present disclosure.

FIG. 7 is a schematic view of a $CO_2$ fixation process, according to various embodiments of the present disclosure. In some embodiments, the fixation process may be performed by the $CO_2$ processor 520 of FIGS. 5 and 6. In this embodiment the $CO_2$ processor 520 comprises a chemical reaction vessel (e.g., reaction tank, etc.). The exhaust processing system 550, 560 in this embodiment comprises a $CO_2$ processor 520 configured to chemically convert the $CO_2$ into solid calcium carbonate.

Referring to FIG. 7, $CO_2$ output from a fuel cell system 502 and solid CaO may be provided to a NaOH solution (e.g., an aqueous solution containing NaOH (l)) located in the $CO_2$ processor 520. The $CO_2$ may react with the NaOH (l) to form $Na_2CO_3$ (l) and $H_2O$ (i.e., water), and the CaO (s) may react with the water to form $Ca(OH)_2$ (l). The $Na_2CO_3$ (l) and $Ca(OH)_2$ (l) in the aqueous solution may then react to form (i.e., precipitate) solid $CaCO_3$ and generate NaOH (l). The suspension containing the precipitated calcium carbonate is then passed through a filter 522 to separate the solid calcium carbonate from the NaOH (l) containing solvent of the suspension, thereby fixing the carbon output from the fuel cell system in a solid form as solid calcium carbonate. The generated NaOH (l) is then recycled back into the process after separating the solid calcium carbonate to react with additional carbon dioxide gas output from the fuel cell system 502.

Heat and Water Recovery

Figure 8:
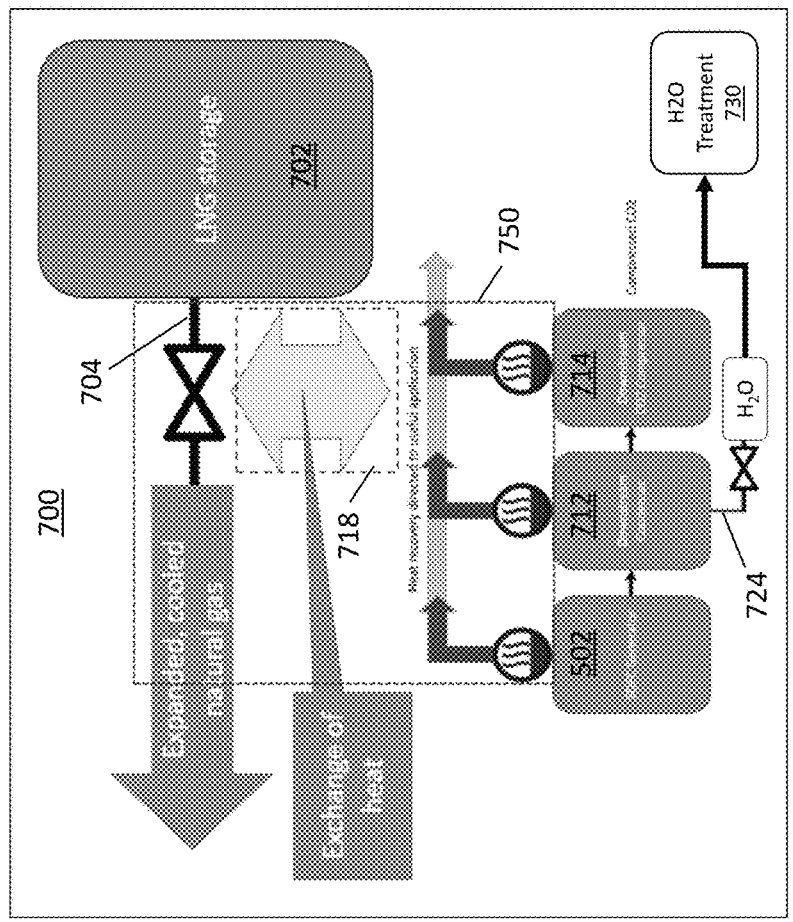
FIG. 8 is a schematic diagram illustrating heat and/or water recovery in a fuel cell power system including $CO_2$ capture, according to various embodiments of the present disclosure.

FIG. 8 is a schematic diagram illustrating heat and/or water recovery in a fuel cell power generation system 700 including $CO_2$ capture, according to various embodiments of the present disclosure. Referring to FIG. 8, exhaust from the fuel cell system 502, which may contain $CO_2$ and/or $H_2O$, may be provided to a condenser 712. Water is condensed from the exhaust in the condenser by cooling the exhaust. The condensed water may be removed from the condenser 712 using a valved water collection conduit 724. The remaining exhaust containing carbon dioxide is provided from the condenser 712 to the $CO_2$ processor 520 which in this embodiment comprises a compressor 714. Thus, the condenser 712 may operate to condense water from the exhaust by removing heat from the exhaust in order to provide dry $CO_2$ exhaust to the compressor 714. The compressor 714 may comprise the gas phase $CO_2$ to liquid or solid phase $CO_2$ for storage with a release of heat during the compression.

This embodiment includes integrating recovered heat from the fuel cell system 502, condenser 712, and/or compressor 714 to provide heat to other integrated uses. This embodiment optionally includes integration of heat exchange from processes such as liquid natural gas (LNG) gasification, which can absorb large quantities of heat with $CO_2$ liquefaction or solidification in an exhaust processing system 750.

FIG. 8 illustrates the capture of heat from the fuel cell system 502 exhaust, the condenser 712, and the compressor 714 being delivered to a downstream heat load, such as a liquid natural gas (LNG) conduit 704 connected to a fuel source which in this embodiment comprises a LNG vessel 702 (e.g., LNG tank). The heat may be provided by fuel cell system 502, condenser 712, and/or compressor 714 via any suitable heat exchanger 718 of the exhaust processing system 750. The heat exchanger 718 may be plate and/or fin type heat exchanger in which hot air heated by heat from the fuel cell system 502, condenser 712, and/or compressor 714 is used to heat LNG output from the LNG vessel 702 into the valved LNG conduit 704 after the valve is opened. Alternatively, the heat exchanger 718 may include a heat exchange medium, such as water or another heat transfer liquid which circulates between the LNG conduit 704 and the fuel cell system 502, condenser 712, and/or compressor 714. The heat exchange may occur between the LNG expansion and conversion into gas phase natural gas in the LNG conduit 704 (which requires heat) and the recovered heat from components 502, 712, and 714. Optionally a heat pump may be used to increase the quality of the heat which is delivered to a downstream use.

In some embodiments, useful water may be recovered from the fuel cell system exhaust. For example, water collected in the condenser 712 may be provided to a water treatment device 730 via conduit 724. The water treatment device 730 may be a chemical process vessel (e.g., heated or unheated tank) configured to neutralize the pH of the received water and/or polish the received water, using a pH neutralizer and/or heating to pasteurize the water. The neutralized and/or pasteurized water output from the water treatment device 730 may be utilized for various applications, such as drinking water, crop irrigation, heat exchanger 718 heat exchange fluid or other chemical process uses.

Liquid Natural Gas (LNG) Heat Exchange and $CO_2$ Sequestration

In other embodiments, generated $CO_2$ may be stored for dispensing at a later time. FIG. 9A illustrates $CO_2$ storage in a location, such as a ship, as (LNG) fuel is depleted.

Shipboard integration provides an example of the embodiment where LNG is gasified and used as fuel, and $CO_2$ is separated and liquefied and stored until the ship returns to port. During the refueling process $CO_2$ may be emptied as LNG is provided to the ship. Furthermore, according to the heat integration embodiment described herein, the efficiency of LNG gasification helps the condensation of $CO_2$.

FIG. 9A is schematic view of a combined LNG fuel cell power and exhaust processing system 900 in a ship S, according to various embodiments of the present disclosure, and FIG. 9B is a schematic view showing components of the exhaust processing system 750 of the system 900. Referring to FIGS. 9A and 9B, the system 900 may be disposed in a ship S, such as a container ship or the like. The system 900 may include a fuel cell system 502 configured to provide electrical power to an electrical load 902 of the ship S and the exhaust processing system 750 that may be configured to gasify LNG and generate compressed $CO_2$. As shown in FIG. 9A, the exhaust processing system 750 may be disposed outside of the fuel cell system 502. However, in other embodiments, one or more components of the exhaust processing system 750 may be disposed within the cabinet of the fuel cell system 502.

The fuel cell system 900 may include a $CO_2$ separation device as discussed above with respect to FIGS. 1A-4. Accordingly, the fuel cell system 900 may be configured to output exhaust that comprises $H_2O$, $CO_2$ and less that 5% by volume $N_2$, such as less than 1% by volume, or less that 0.5% by volume $N_2$.

The exhaust processing system 750 may be fluidly connected to an LNG container 702 by an LNG conduit 704. The LNG container 702 may be configured to store LNG at a temperature of about at or below a temperature of about −163° C., e.g., below the −161° C. condensation temperature of natural gas. A pump or blower 703 configured to pump LNG from the container 702 to the exhaust processing system 750, may be disposed outside the LNG container 702 on the LNG conduit 704.

An exhaust outlet of the fuel cell system 502 may be fluidly connected to an inlet of the exhaust processing system 750 by an exhaust inlet conduit 706. A fuel conduit 506 may fluidly connect a natural gas (NG) outlet of the exhaust processing system 750 to a fuel inlet of the fuel cell system 502. The fuel cell system 502 may be electrically connected to a load 902, such as a primary and/or secondary electrical load of the ship S.

The exhaust processing system 750 may include the condenser 712, a compressor 714, one or more heat exchangers 716, 718 and a storage vessel, such as carbon dioxide storage tank 720, which may be sequentially fluidly connected by a processing conduit 722. The optional first heat exchanger 716, condenser 712 and/or compressor 714 may be fluidly connected to a water collection conduit 724.

The optional first heat exchanger 716 may be configured to reduce the temperature of the fuel cell system exhaust. For example, in some embodiments, the first heat exchanger 716 may use air to cool the system exhaust. In other embodiments, the first heat exchanger 716 may utilize NG to cool the system exhaust while heating the NG being provided via conduit 506 to the fuel cell system 502. For example, the first heat exchanger 716 may be configured to cool the system exhaust to a temperature ranging from about 200° C. to about 25° C., to facilitate subsequent compression of $CO_2$ in the system exhaust. The system exhaust may be maintained above 0° C., in order to prevent freezing of water present in the system exhaust.

The first heat exchanger 716 may also increase the temperature of the NG provided thereto, in order to improve the efficiency of the fuel cell system 502. For example, the first heat exchanger 716 may heat the NG to a temperature ranging from about 100° C. to about 300° C. A first water stream may be removed from the first heat exchanger 716 if the temperature of the system exhaust is below 100° C. in the first heat exchanger 716.

The condenser 712 may be configured to cool the system exhaust provided from the first heat exchanger below 100° C. to condense water out of the system exhaust. The system exhaust comprising mostly carbon dioxide is then provided from the condenser to the compressor 714. A second water stream is output from the bottom of the condenser 712.

The compressor 714 may be configured to compress the system exhaust provided from the condenser 712 and thereby generate a third water stream. The compressed exhaust comprising mostly carbon dioxide may then be provided to the second heat exchanger 718 to exchange heat with the LNG provided in conduit 704 and convert the LNG to NG.

Water extracted by the first heat exchanger 716, condenser 712 and/or compressor 714, may be collected by the collection conduit 724. The collected water may be provided to an optional water treatment device 730 for neutralization and/or polishing.

The second heat exchanger 718 may be configured to cool the system exhaust to a temperature sufficient to generate liquid $CO_2$ using LNG in conduit 704 output from the LNG vessel 702. For example, the second heat exchanger 718 may be configured to cool the system exhaust comprising mostly carbon dioxide to a temperature ranging from about −20° C. to about −30° C.

In some embodiments, the second heat exchanger 718 may be configured to gradually heat the LNG to vaporize the LNG and form NG. The second heat exchanger 718 may also permit the gradual expansion of the LNG as it is converted to NG. As shown in FIG. 9B, the NG may be provided to the first heat exchanger 716 by the fuel conduit 708. However, in other embodiment, the fuel conduit 708 may provide the NG directly to the fuel cell system 502 via conduit 506, and the first heat exchanger 716 may be omitted or provided with air to cool the system exhaust. Compressed or liquid $CO_2$ output from the processing conduit 722 may be stored in the storage tank 720.

In some embodiments, the exhaust processing system 750 may optionally include a vaporizer 732. For example, if the heat provided by the system exhaust is insufficient to completely vaporize the LNG, the vaporizer 732 may operate to vaporize and expand the LNG using heat extracted from a second fluid. For example, the vaporizer 732 may be selectively operated during system startup, or during periods of the fuel system 200 is operated under low load conditions. The second fluid may be water provided from a water tank on the ship S, or may be fresh or seawater provided from outside of the ship S, and then heated by a heater in the vaporizer. The water vapor may be added to the NG in the vaporizer to humidify the NG provided to the fuel cell system 502.

In other embodiments, the condenser 712, compressor 714, and/or second heat exchanger 718 may be replaced with a $CO_2$ fixation system configured to generate solid $CO_2$. For example, the $CO_2$ fixation system may be configured to generate solid $CaCO_3$, using the method of FIG. 7.

In still other embodiments, the system 900 may optionally include a reservoir 510 described in FIG. 5, which is configured to buffer pressure variations generated during processing the fuel cell system exhaust. In some embodiments, the system 900 may include additional components described herein but not shown in FIGS. 9A and 9B. For example, the system may include the drain valve 512 and relief valve 514 of FIG. 5, and/or the sensor (e.g., measurement valve) 504 and CPU 530 of FIG. 6.

The systems 700 and 900 of the embodiments of FIGS. 8, 9A and 9B includes an exhaust processing system 750 which comprises: a condenser 712 configured to condense water from the exhaust output from the fuel cell system 502, a compressor 714 disposed downstream of the condenser 712 with respect to a flow direction of the exhaust and configured to compress the $CO_2$ in the exhaust, and at least one heat exchanger 716, 718 configured to heat fuel provided to the fuel cell system 502 using heat from at least one of the condenser or the compressor.

In the system 900 of the embodiments of FIGS. 9A and 9B, the at least one heat exchanger comprises a first heat exchanger 716 disposed upstream of the condenser 712, and configured to heat the fuel using heat from the exhaust, and a second heat exchanger 718 configured to heat the fuel using heat from at least one of the condenser 712 or the compressor 714. In one embodiment, the second heat exchanger 718 is configured to convert the exhaust into liquid $CO_2$. In one embodiment, the system 700 or 900 further comprises a liquid natural gas (LGN) vessel 702 configured to provide the fuel in a form of liquid natural gas (LGN) to the second heat exchanger 718 via a LGN conduit 704, and the fuel is in the form of natural gas (NG) when the fuel is output from the first heat exchanger 716 to the fuel cell system 502.

In one embodiment, the system 900 further comprises vaporizer 732 configured to vaporize water to humidify the fuel during system 900 startup using an external heat source. In one embodiment, the system 700 or 900 further comprises a water treatment device 730 configured to at least one of neutralize or polish water received from the condenser 712. In one embodiment, the fuel cell system 502 is located on a ship and is electrically connected to an electrical load 902 of the ship.

The foregoing description of the invention has been presented for purposes of illustration and description. It is not intended to be exhaustive or to limit the invention to the precise form disclosed, and modifications and variations are possible in light of the above teachings or maybe acquired a practice of the invention. The description was chosen in order to explain the principles of the invention and its practical application. It is intended that the scope of the invention as defined by the claims appended hereto, and their equivalents.

The invention claimed is:

1. An integrated power generation and exhaust processing system comprising:
   a fuel cell system configured to generate power and to separate $CO_2$ included in exhaust output from the fuel cell system; and
   an exhaust processing system configured to at least one of sequester or densify $CO_2$ separated from the exhaust output from the fuel cell system,
   wherein the fuel cell system comprises a solid oxide fuel cell stack configured to generate the power, and a carbon dioxide separation device configured to separate the $CO_2$ included in the exhaust output from the fuel cell system.

2. The system of claim 1, wherein the exhaust processing system comprises:
   a reservoir configured to receive exhaust output from the fuel cell system; and
   a compressor configured to compress exhaust output from the reservoir,
   wherein the reservoir is configured to reduce an amount of exhaust backpressure applied to the fuel cell system.

3. The system of claim 2, wherein the reservoir comprises a relief valve configured to prevent the exhaust backpressure in the reservoir from exceeding a preset level.

4. The system of claim 3, wherein the preset level is less than an amount of pressure that would damage the fuel cell system.

5. The system of claim 2, wherein the reservoir comprises internal baffles configured to reduce the amount of exhaust backpressure applied to the fuel cell system.

6. The system of claim 2, wherein the exhaust processing system further comprises a cooling system configured to reduce the temperature of the exhaust in the reservoir.

7. The system of claim 1, wherein the exhaust processing system comprises:
   a sensor configured to measure a characteristic of a fuel that is provided to the fuel cell system; and
   a central processing unit configured to determine an amount of $CO_2$ in the exhaust output from the fuel cell system based on a measurement by the sensor.

8. The system of claim 1, wherein the exhaust processing system comprises a $CO_2$ processor configured to chemically convert the $CO_2$ into solid calcium carbonate.

9. The system of claim 1, wherein the exhaust processing system comprises:
   a condenser configured to condense water from the exhaust output from the fuel cell system;
   a compressor disposed downstream of the condenser with respect to a flow direction of the exhaust and configured to compress the $CO_2$ in the exhaust; and
   at least one heat exchanger configured to heat fuel provided to the fuel cell system using heat from at least one of the condenser or the compressor.

10. The system of claim 9, wherein the at least one heat exchanger comprises:
    a first heat exchanger disposed upstream of the condenser, and configured to heat the fuel using heat from the exhaust; and
    a second heat exchanger configured to heat the fuel using heat from at least one of the condenser or the compressor.

11. The system of claim 10, wherein the second heat exchanger is configured to convert the exhaust into liquid $CO_2$.

12. The system of claim 10, further comprising a liquid natural gas (LGN) vessel configured to provide the fuel in a form of liquid natural gas (LGN) to the second heat exchanger via a LGN conduit; and
    the fuel is in the form of natural gas (NG) when the fuel is output from the first heat exchanger.

13. The system of claim 12, further comprising a vaporizer configured to vaporize water to humidify the fuel during system startup using an external heat source.

14. The system of claim 9, further comprising a water treatment device configured to at least one of neutralize or polish water received from the condenser.

15. The system of claim 9, wherein the fuel cell system is located on a ship and is electrically connected to an electrical load of the ship.

16. A method of operating a fuel cell system, comprising:
    providing a fuel to a fuel cell system;
    operating the fuel cell system to generate power and a fuel exhaust stream;
    separating $CO_2$ from the fuel exhaust stream using a carbon dioxide separation device to generate a $CO_2$ containing exhaust and a purified exhaust;
    providing the separated $CO_2$ containing exhaust to an exhaust processing system;
    at least one of sequestering or densifying $CO_2$ in the $CO_2$ containing exhaust using the exhaust processing system,
    condensing water from the $CO_2$ containing exhaust;
    compressing the $CO_2$ in the $CO_2$ containing exhaust; and heating a fuel provided to the fuel cell system using heat generated from at least one of the condensing or the compressing.

17. The method of claim 16, wherein:
fuel cell system is located on a ship and is electrically connected to an electrical load of the ship;
the fuel comprises liquid natural gas (LNG) stored in a LNG vessel;
the compressed $CO_2$ is stored in a $CO_2$ storage vessel; and
when the ship arrives at a port, the LNG is filled into the LNG vessel and the $CO_2$ is removed from the $CO_2$ storage vessel.

18. A method of operating a fuel cell system, comprising:
providing a fuel to a fuel cell system;
operating the fuel cell system to generate power and a fuel exhaust stream;
separating $CO_2$ from the fuel exhaust stream using a carbon dioxide separation device to generate a $CO_2$ containing exhaust and a purified exhaust;
providing the separated $CO_2$ containing exhaust and solid CaO to a NaOH containing solution, such that the $CO_2$ gas reacts with the NaOH (l) to form $Na_2CO_3$ (l) and water, such that the CaO (s) reacts with the water to form $Ca(OH)_2$ (l), and such that the $Na_2CO_3$ (l) and the $Ca(OH)_2$ (l) react to precipitate solid $CaCO_3$ and generate NaOH (l); and
recycling the generated NaOH (l) to react with additional $CO_2$ gas.

* * * * *